United States Patent [19]

Thibaut et al.

[11] Patent Number: 4,814,413

[45] Date of Patent: Mar. 21, 1989

[54] HEAT-MELTABLE POLYMER FOR USE AS ADHESIVE AGENT, METHOD FOR MANUFACTURING THE SAME AND APPLICATION THEREOF FOR THE GLUING OF SUBSTRATE MATERIALS

[75] Inventors: Jean-Pierre Thibaut; Philippe Tezenas, both of Blois; Iancu Vittan, Onzain, all of France

[73] Assignee: Eschem, S.A., Blois, France

[21] Appl. No.: 157,495

[22] Filed: Feb. 18, 1988

[30] Foreign Application Priority Data

Mar. 13, 1987 [FR] France ................................ 87 03441

[51] Int. Cl.$^4$ .............................................. C08G 18/34
[52] U.S. Cl. ....................................................... 528/80
[58] Field of Search ........................................... 528/80

[56] References Cited

U.S. PATENT DOCUMENTS 3,775,354 11/1973 Hostettler et al. .................... 528/80
4,748,201  5/1988 Smith .................................... 528/80

*Primary Examiner*—Maurice J. Welsh
*Attorney, Agent, or Firm*—Bell, Seltzer, Park & Gibson

[57] ABSTRACT

A heat-meltable polymer, adapted for use as an adhesive agent, which contains a block prepolymer comprising polyurethane and polycaprolactore sequences and a free NCO group rate comprised between 1% and 5%.

19 Claims, No Drawings

HEAT-MELTABLE POLYMER FOR USE AS ADHESIVE AGENT, METHOD FOR MANUFACTURING THE SAME AND APPLICATION THEREOF FOR THE GLUING OF SUBSTRATE MATERIALS

BACKGROUND OF THE INVENTION

Field of the Invention

The present invention concerns a heat-meltable polymer, for use as an adhesive agent to cause to render the surfaces of identical or different substrate materials adhesive.

With a view to gluing to each other two surfaces of identical or different materials, it is desired to use an adhesive material that provides strong and rapid adherence between these two surfaces, which adherence should not be sensitive to variations in temperature and should present good mechanical properties.

Summary of the Invention

According to the present invention, there is provided a heat-meltable prepolymer block comprising polyurethane and polycaprolactone sequences and presenting a free NCO group rate comprised between 1% and 5%. Obviously this prepolymer may comprise blocks formed of the initial components.

In this prepolymer the weight proportion of the —N-C—CO.O— urethane sequences and the —$(C_6H_{10}O_2)_n$—polycaprolactone sequences preferably ranges from 1.1% to 2.1% and from 10% to 40%, respectively.

This prepolymer is obtained by reaction of:
1. a polycaprolactone-based resin comprising free OH groups;
2. a low melting point polyol; and
3. a diisocyanate having a functional rate comprised between 1.1 and 4.

After cross-linking the prepolymers according to the invention present a good heat resistance at temperatures ranging from about 50° C. to about 140° C. Their viscosity is relatively low, which facilitates their use in coating or spreading devices. They have a high adhesive power and good mechanical properties.

Due to these properties, the prepolymers according to the invention are adapted to be used, as binding agents, to cause the surfaces of identical or different materials to adhere to each other. Their application is simple and due to their high adhesive power, the materials the surfaces of which are thus bound to each other can be handled immediately after gluing. The heat resistance of such prepolymers after consecutive cross-linking allows them to retain their adhesive power at temperatures up to about 140° C. In fact, their mechanical properties improve with time on account of a cross-linking which occurs after their application on the substrates and which is due to the presence of the free NCO groups, these groups reacting with the humidity of the air or of the active groups of the treated substrates.

The weight proportions of each of these components are comprised between 10 and 40 for the polycaprolactone-based resin, between 40 and 80 for the polyol and between 10 and 30 for the diisocyanate. Preferably, the weight proportions of the heat-meltable prepolymer components are about 25/60/15 respectively.

As indicated herein-above, the prepolymers according to the invention result from the reaction of a polycaprolactone-based resin, a polyol and a diisocyanate.

The polyol is an aliphatic homopolyester having a low melting point of less than 100° C., comprising hydroxyl end groups. Its molecular weight is comprised between 2,000 and 6,000. It presents a hydroxyl rate comprised between 20 and 110 and its melting point is preferably comprised between 50° C. and 90° C. A polymer of this type is preferably a condensation polymer of adipic acid and hexanediol or crystalline polyester issued from a polycondensation reaction of linear diacid with a linear diol. The function of this compound is to adjust the open time and the setting time of the heat-meltable mass.

By "open time" is meant the lapse of time between the application of the adhesive and the close contacting of the related substrates with or without pressure. The limit open time is the duration beyond which the joining or assembling becomes "ineffective". By "setting time" is meant the period during which the adhesion and cohesion forces are developed by chemical or physical means, for example by cooling and cross-linking. The "limit setting time" is the minimum setting time at the end of which the assembly can be handled.

By using a polymer of this type, it is possible to obtain open times and limit setting times comprised between 30 seconds and 10 minutes. These periods depend upon the molecular weights for any given structure. Thus, a higher molecular weight will result in a shorter limit setting time than a lower molecular mass. This prepolymer also acts as a solvent medium for the other components prior to the addition of the diisocyanate. The polyol confers upon the final prepolymer good mechanical properties, with respect to tensile strength and elongation at yield point. It allows a prepolymer to be obtained which has good stability at temperatures comprised between 160° and 200° C. The polyol also allows to obtain a polymer mass having a relatively low viscosity, which facilitates its utilization in coating devices. At 150° C., the final polymer, presents a viscosity comprised between 5,000 and 100,000 mPa.s.

The second component of the prepolymer according to the invention is a polycaprolactone-based resin comprising free OH groups. This resin can be a polyester having the polycaprolactone structure, such as the "Tone PCL 700"® manufactured by the Union Carbide Company. This product has an average molecular weight of 40,000, a melting point of 60° C., a vitreous transition temperature of −60° C. The elongation percentage is comprised between 500 and 1,000 and the hydroxyl group rate is comprised between 0.7 to 1.5%.

This resin may or may not be associated to a copolyester formed by polycondensation from adipic acid, isophthalic acid and hexanediol. The network or lattice can be amorphous to crystalline. This copolyester can be in the liquid or solid state and have a molecular weight comprised between 1,000 and 15,000. The hydroxyl index is comprised between 5 and 150. This polyester allows the adhesiveness on substrates such as metals to be improved. It allows the internal plastification of the prepolymer.

The resin can also be associated to a slightly crystalline linear polyurethane. The latter is derived from a polyester and a olyisocyanate. A convenient polyurethane has a hydroxyl percentage rate comprised between 0.1 and 0.3 and a molecular weight ranging from 10,000 to 50,000.

The resin used for carrying out the invention must be compatible with and soluble in the low melting point homopolyester (polyol) in order to form a homogeneous and liquid mixture at a temperature comprised between 80° and 130° C., into which mixture the third component, the diisocyanate, can be introduced so as to initiate the reaction with each of the hydroxylated constituents.

This resinous component confers upon the final prepolymer mechanical properties (initial elasticity modulus and rupture strength) which are very advantageous when the prepolymer is to be used as an adhesive, and this is obtained even before the cross-linking of the prepolymer occurs, due to the free isocyanate groups reacting with the humidity of the air.

The third component of the prepolymer according to the invention is an aromatic, aliphatic or cycloaliphatic diisocyanate having a function rate comprised between 1.1 and 4. It is possible to use as diisocyanate, pure 4,4'-diphenylmethane diisocyanate or mixtures of 2,4' and 4,4' isomers of diphenylmethane diisocyanate or diisocyanate adducts. It is also possible to use isophorone diisocyanate and hexamethylene diisocyanate. More generally, the acidity is kept low in order to provide good reactivity (% of HCl between 0.003 and 0.008).

The final polymer according to the invention must contain a percentage of free isocyanate groups comprised between 1 and 5% and preferably between 1.5 and 2%. These free isocyanate groups react with the humidity of the air or of the active groups of the substrates to be treated, thereby allowing to improve the adhesivity between the substrates and to obtain good strength properties at temperatures ranging from 50° C. to 140° C. In order to obtain an improved reticulation of the polymer after coating onto the substrates, the diisocyanate has preferably a function rate higher than 2.

One particularly advantageous heat-meltable prepolymer comprises a polyester having a polycaprolactone structure of which the percentage of hydroxyl groups is comprised between 0.7 and 1.5, a low melting point homopolyester obtained by polycondensation of adipic acid and hexanediol, having a hydroxyl rate comprised between 20 and 100, and diphenylmethane diisocyanate, in weight proportions of respectively 25/60/15.

The heat-meltable polymer of the present invention, is prepared by mass polyaddition, associating the caprolactonebased polymer and the polyol, and by thereafter adding the diisocyanate. The reaction temperature is comprised between 0° C. and 130° C. The polymers are thus melted and the reaction medium is homogeneous. To eliminate the water contained in the different polyols, a vacuum is created in the reactor. The duration of the polyaddition reaction is from 3 to 4 hours.

The isocyanate is introduced in sufficient quantity so that at the end of the reaction the rate in free NCO groups is comprised between 1 and 5%, preferably between 1.5 and 2%. The presence of these free NCO groups is important since it will allow a ross-linking of the heat-meltable polymer on account of the reaction of the NCO groups with the humidity in the air or the active groups of the substrates to be treated, thereby bringing about an improvement to the mechanical and thermal properties.

The polymer is obtained in the form of a solid mass at a temperature lower than 40° C. It is possible to store it, sheltered from humidity, in any suitable container.

Different additives can thus be added during preparation of the heat-meltable polymer so as to modify its properties.

Thus, it is possible to add plasticizers allowing, as it is well known, to modify the plastic properties of the polymer. It is possible to add inert plastifiers such as dibutyl phthalate or dioctyl phthalate. It is also possible to use cross-linkable plastifiers that comprise free hydroxyl groups, for example, polyethers or polyesters. Their molecular weight is comprised, for example, between 1,000 and 2,000. They are added in quantities comprised between 5 and 10%.

It is also possible to use all known fillers and, in particular, pyrogenous silica having been subjected to a surface treatment in order to render it water-repellent, carbon black ensure a more rapid core cross-linking by humidity transfer. It is also possible to add titanum bioxide. The fillers are introduced in amounts ranging from 1 to 5%.

It is also possible to use adhesiveness promotors such as epoxysilanes. They can be added at the time of the polymerization reaction. An improvement of the adhesiveness with respect to different metals is thus obtained, especially on aluminum. Addition of catalysts such as amines (Union Carbide, Niax TMBDA ®) in amounts of 0.005% allows to improve the cross-linking speed in the presence of humidity.

| EXAMPLES OF FORMULAE | | | | | |
| --- | --- | --- | --- | --- | --- |
| diisocyanate | 184 | 195 | 247 | 196 | 197 |
| crystalline polymer | 800 | 700 | 700 | 700 | 800 |
| caprolactone resin | 200 | 300 | 200 | 200 | |
| cross-linkable plastifying resin | | | 100 | | |
| copolyester resin | | | | 100 | |
| polyurethane resin | | | | | 200 |

When the prepolymer according to the invention is used as adhesive compound to bind two surfaces, the polymer is heated to a temperature of about 158° C. in order to form a molten mass. It is applied to at least one of the surfaces that are to be glued to each other. The two surfaces are applied one against the other and through cooling a strong adherence is obtained that allows the immediate handling of the assembly.

Numerous substrates can thus be treated, such as, for example, aluminum, steel, plastics such as PVC, acrylonitrile-butadiene styrene copolymer (ABS), stratified polymers, polyamides, treated polyolefins, polyurethane and vinyl polychloride foams, polycarbonates, etc. It is possible to treat materials such as wood, agglomerated panels, cardboard, paper. It is also possible to glue textile substrates such as viscose, polyester and non-woven polyamide materials.

To apply the heat-meltable polymer according to the invention, it is possible to use any suitable means, and especially, a nozzle, a flat extruding die, for example. Thus, the heat-meltable polymer is melted in a humidity-proof melting trough and conveyed by means of a gear pump through heated pipes towards the coating head. Coating by means of a flat die is particularly well adapted for putting in place by gluing, or for coating, a flexible multiply structure substrate presented in width. The heat-meltable mass is melted in a humidity-proof melting trough and conveyed, by means of a pump or extrusion screw, towards the die. It is also possible to apply the heat-meltable polymer according to the invention by extrusion from heated cartridges so as to deposit it in the shape of ribbons or strands. This method can be used for filling or gluing pieces having small dimensions.

The polymer according to the invention is particularly suitable for in line gluing operations at high speed, due to its properties allowing it to be used without a solvent and conferring thereupon an increased heat resistance and inertia with respect to solvents and water.

It is also suitable for coextensively gluing flexible films onto each other by co-extrusion or extrusion-coating of a film, on substrates of any kind with the purpose of modifying the physical and chemical properties (thermal and mechanical strength) without it being necessary to apply on the first substrate a primary "fastening" coating to ensure the perfect adherence of the films.

EXAMPLE 1

In a clean and dry Pyrex glass reactor having a two-liter capacity, heated by a thermal fluid, is introduced the polyol (low melting point homopolyester deriving from adipic acid and hexanediol) in a quantity representing 60% of the total mass of the final polymer. It is melted at a temperature of about 120° C. When the mixture has melted, the polycaprolactone resin, such as the product "Tone PCL 700" ® commercially available from Union Carbide Co. is added under intensive stirring, in a quantity representing 25 parts of the total mass of the final polymer. A 19.9 kPa vacuum is created in the reactor for thirty minutes in order to eliminate the water contained in the polyol. As the dissolution of the resin in the polyester progresses the pressure varies to reach 3.99 kPa. It is admitted that after two to three hours, the water content in the mixture is negligible and cannot influence the continuation of the reaction.

While the reactor is still under vacuum (3.99 kPa) liquid diphenylmethane-4,4'-diisocyanate is introduced under stirring in a quantity representing 15 parts of the total mass of the final polymer by means of a dropping funnel.

After completing the addition of diisocyanate, the reaction is allowed to continue for four hours at a temperature of 120°–130° C. The isocyanate group content which must be about 2% is checked.

The polymer obtained can then be used for gluing to each other two surfaces of different or identical materials such as mentioned herein-above, or the polymer is poured into perfectly sealed packagings, in order to be stored so as to be protected from humidity.

The polymer is obtained in the form of a mass which is in the solid state at temperatures lower than 40° C.

TABLE I
COMPARATIVE TABLE OF MECHANICAL CHARACTERISTICS

|  | Reference | Example 1 PU |
|---|---|---|
| AT 23° C. | | |
| Initial modulus | 6 N/mm$^2$ | 65 N/mm$^2$ |
| Initial maximum stress | 1.6 N/mm$^2$ | 2 N/mm$^2$ |
| Modulus after 10 days | 6 N/mm$^2$ | 160 N/mm$^2$ |
| Maximum stress after 10 days | 1.6 N/mm$^2$ | 18 N/mm$^2$ |
| Elongation at rupture after 10 days | 700% | 500% |
| Adhesiveness after 5 days Shear strength: | | |
| WOOD/ABS | 1.4 N/mm$^2$ | 5 N/mm$^2$ |
| ABS/ALU | 0.8 N/mm$^2$ | 7 N/mm$^2$ |
| AT 120° C. | | |
| Modulus after 7 days | — | 0.7 N/mm$^2$ |
| Maximum shear strength after 7 days | — | 0.5 N/mm$^2$ |
| Modulus after 14 days | — | 1.0 N/mm$^2$ |
| Maximum stress after 14 days | — | 0.8 N/mm$^2$ |
| Adhesiveness after 14 days Shear strength: | | |
| ABS/ALU | — | 0.5 N/mm$^2$ |

N.B.

The conventional heat-meltable reference sample has a softening point lower than 100° C. and, consequently, its mechanical strength at 120° C. is nil.

The polymer thus obtained can be used to glue an ABS surfaces and an aluminum surface to each other. For this purpose, a layer of heat-meltable polymer is applied by any conventional method. For example, the polymer is melted at 150° C. in a humidity-proof melting trough and it is thereafter conveyed by means of a gear pump, through heated pipes, toward a coating head. The polymer is applied to the surface of one of the materials, then the non treated surface of the other material is brought into contact with the adhesive polymer layer. A strong adherence is achieved, allowing handling immediately after cooling.

The product obtained has good mechanical properties, such as indicated on the following table. By way of comparison, the properties of a reference heat-meltable polymer are indicated, namely ethylene/vinyl acetate-based copolymer.

EXAMPLE 2

Proceeding as described in Example 1, the components indicated in table II herein-below are used in the amounts set forth.

TABLE II

| Example | 2 | 3 | 4 | 5 | 6 |
|---|---|---|---|---|---|
| PCL 700 (Union Carbide) | 11.5 | 36 | 30 | 12 | 17 |
| 1 Polyol | 61.5 | 52 | 44 | 77 | 68.5 |
| 2 Diisocyanate | 27 | 12 | 26 | 11 | — |
| 3 Adduct | — | — | — | — | 14.5 |
| At 23° C. | | | | | |
| Initial modulus | 65 N/mm$^2$ | 83 N/mm$^2$ | 60 N/mm$^2$ | 78 N/mm$^2$ | 72 N/mm$^2$ |
| Initial maximum stress | 6.8 N/mm$^2$ | 9.2 N/mm$^2$ | 6.1 N/mm$^2$ | 9.2 N/mm$^2$ | 7.5 N/mm$^2$ |
| Modulus after 10 days | 160 N/mm$^2$ | 168 N/mm$^2$ | 127 N/mm$^2$ | 150 N/mm$^2$ | 130 N/mm$^2$ |
| Elongation at rupture after 10 days | 50% | >500% | 200% | >500% | 500% |
| Adhesiveness after 5 days Shear strength | | | | | |
| Wood/ABS | 5.0 N/mm$^2$ | 5.0 N/mm$^2$ | 1.3 N/mm$^2$ | 4.3 N/mm$^2$ | 8.0 N/mm$^2$ |
| ABS/ALU | 2.3 N/mm$^2$ | 4.9 N/mm$^2$ | 2.0 N/mm$^2$ | 2.6 N/mm$^2$ | 5.4 N/mm$^2$ |

TABLE II-continued

| Example | 2 | 3 | 4 | 5 | 6 |
|---|---|---|---|---|---|
| At 120° C. | | | | | |
| Modulus after 7 days | 0.4 N/mm$^2$ | 0.1 N/mm$^2$ | 0.2 N/mm$^2$ | 0.02 N/mm$^2$ | 0.2 N/mm$^2$ |
| Maximum stress after 7 days | 0.3 N/mm$^2$ | 0.2 N/mm$^2$ | 0.1 N/mm$^2$ | 0.03 N/mm$^2$ | 0.1 N/mm$^2$ |
| Modulus after 14 days | 0.5 N/mm$^2$ | 0.5 N/mm$^2$ | 0.7 N/mm$^2$ | 0.2 N/mm$^2$ | 0.6 N/mm$^2$ |
| Maximum stress after 14 days | 0.7 N/mm$^2$ | 0.6 N/mm$^2$ | 0.6 N/mm$^2$ | 0.2 N/mm$^2$ | 0.6 N/mm$^2$ |
| Adhesiveness after 14 days | | | | | |
| Shear strength | | | | | |
| ABS/ALU | 0.01 N/mm$^2$ | 0.1 N/mm$^2$ | 0.1 N/mm$^2$ | 0.2 N/mm$^2$ | 0.07 N/mm$^2$ |

1 Polyol: aliphatic acid homopolyester and hexanediol, molecular weight 5 000
2 44M ® type 2 function rate diisocyanate by Bayer or M324 ® isonate by Dow Chemical
3 Desmodur PC type adduct by Bayer.

We claim:

1. A heat-meltable polymer, adapted for use as an adhesive agent, formed of a block prepolymer having polycaprolactone and polyurethane sequences and comprising:
   (a) a polycaprolactone-based resin having from about 0.7 to 1.5 percent free OH groups per mole of the heat-meltable polymer;
   (b) a low melting point polyol; and
   (c) a diisocyannate having a function rate from about 1.1 to 4 and having from about 1 to 5 percent free NCO groups per mole of the heat-meltable polymer.

2. A polymer according to claim 1, wherein the weight proportion of the —NC—CO.O—urethane sequences and the —(C$_6$H$_{10}$O$_2$)$_n$-polycaprolactone sequences ranges from about 1.1% to 2.1% and from 10% to 40% respectively.

3. A polymer according to claim 1, wherein the polycaprolatone-based resin is a polyester resin having an average molecular weight of 30,000 to 40,000, a melting point of 60° C. and a vitreous transition temperature of −60° C.

4. A polymer according to claim 3, wherein said resin comprises polyesters having the caprolactone structure, added to a slightly crystalline linear polyurethane derived from a polyester and from a polyisocyanate, or added to a copolyester formed by polycondensation of adipic acid, isophthalic acid and hexanediol.

5. A polymer according to claim 1, wherein the polyol is an aliphatic homopolyester having a melting point lower than 100° C. and comprising hydroxyl end groups, the molecular weight of the homopolyester being comprised between 2,000 and 6,000, the hydroxyl index being comprised between 20 and 100 and the melting point ranging from about 50° C. to 90° C.

6. A polymer according to claim 5, wherein the polyol is either a condensation polymer of adipic acid and of hexanediol or a crystalline polyester issued from the polycondensation reaction of linear diacid and linear diol.

7. A polymer according to claim 1, wherein the diisocyanate is selected from the group comprising pure 4,4' diphenylmethane diisocyanate, mixtures of 2,4' and 4,4' isomers of diphenylmethane diisocyanate, diisocyanate adducts, isophorone diisocyanate and hexamethylene diisocyanate.

8. Polymer according to claim 1, wherein the weight proportion of the components are respectively comprised between 10 and 40 for the caprolactone prepolymer, between 40 and 80 for the polyol and between 10 and 30 for the diisocyanate.

9. A polymer according to claim 1, which is formed of:
   1. polycaprolactone having from about 0.7 to 1.5 percent free OH groups per mole of the heat-meltable polymer;
   2. adipic acid and hexanediol homopolyester of which the hydroxyl index is between 20 and 110; and
   3. 4,4' diphenylmethane diisocyanate.

10. A polymer according to claim 9 wherein the respective weight proportions of the components are 25/60/15.

11. A polymer according to claim 10, which contains from 1.5 to 2% free isocyanate groups.

12. A polymer according to claim 11, which contains 2% free isocyanate groups.

13. A polymer according to claim 12, which has a viscosity of between 5,000 and 100,000 mPa.s at 150° C.

14. A polymer according to claim 13, which is in the solid state at temperatures lower than 40° C.

15. A heat-meltable polymer, adapted for use as an adhesive agent, formed of a block prepolymer having polycaprolactone and polyurethane sequences and comprising:
   (a) from about 10 to 40 percent by weight of a polycaprolactone-based polyester resin having form about 0.7 to 1.5 percent free OH groups per mole of the heat-meltable polymer, an average molecular weight of 30,000 to 40,000, a melting point of about 60° and a vitreous transition temperature of about −60°;
   (b) from about 40 to 80 percent by weight of a low melting aliphatic homopolyester polyol having hydroxyl end groups, a molecular weight of from about 2,000 to 6,000, and a hydroxyl index between about 20 and 100; and
   (c) from about 10 to 30 percent by weight of a diisocyanate having a function rate from about 1.1 to 4 and having from about 1 to 5 percent free NCO groups per mole of the heat-meltable polymer.

16. A polymer according to claim 15 wherein the resin is added to a slightly crystalline linear polyurethane derived from a polyester and from a polyisocyanate, or added to a copolyester formed by polycondensation of adipic acid, isophthalic acid and hexandediol.

17. A polymer acording to claim 15, wherein the weight proportion of the —NC—CO.O— urethane sequences and the —(C$_6$H$_{10}$OO$_2$)$_n$- polycaprolactone sequences ranges from about 1.1% to 2.1% and from 10% to 40% respectively.

18. A polymer according to claim 15, wherein the polyol is either a condensation polymer of adipic acid and of hexanediol or a crystalline polyester issued from the polycondensation reaction of linear diacid and linear diol.

19. A polymer according to claim 15, wherein the diisocyanate is selected from the group comprising pure 4,4' diphenylmethane diisocyanate, mixtures of 2,4' and 4,4' isomers of diphenylmethane diisocyanate, diisocyanate adducts, isophorone diisocyanate and hexamethylene diisocyanate.

* * * * *

UNITED STATES PATENT AND TRADEMARK OFFICE
CERTIFICATE OF CORRECTION

PATENT NO. : 4,814,413

DATED : March 21, 1989

INVENTOR(S) : Jean-Pierre Thibaut, et al.

It is certified that error appears in the above-identified patent and that said Letters Patent is hereby corrected as shown below:

The third inventor's name "Iancu Vittan" should be
-- Iancu Vitian --.

Column 2, line 65, "olyisocyanate" should be
-- polyisocyanate --.

Column 3, lines 48 and 49, "caprolactonebased" should be
-- caprolactone-based --.

Column 3, line 51 "0°C" should be -- 80°C --.

Column 3, line 60, "ross-linking" should be
-- cross-linking --.

Column 8, line 42, "form" should be -- from --.

Signed and Sealed this

Nineteenth Day of December, 1989

*Attest:*

JEFFREY M. SAMUELS

*Attesting Officer*    *Acting Commissioner of Patents and Trademarks*